US011555432B2

(12) United States Patent
Capirchia et al.

(10) Patent No.: US 11,555,432 B2
(45) Date of Patent: Jan. 17, 2023

(54) EXHAUST GAS POST-TREATMENT DEVICE

(71) Applicant: FAURECIA SYSTEMES D'ECHAPPEMENT, Nanterre (FR)

(72) Inventors: Sonia Capirchia, Pont-de-Roide-Vermondans (FR); Marion Gonzalez, Montbeliard (FR); Vincent Lebourgeois, Voujeaucourt (FR)

(73) Assignee: FAURECIA SYSTEMES D'ECHAPPEMENT

( * ) Notice: Subject to any disclaimer, the term of this patent is extended or adjusted under 35 U.S.C. 154(b) by 0 days.

(21) Appl. No.: 17/537,617

(22) Filed: Nov. 30, 2021

(65) Prior Publication Data
US 2022/0178289 A1 Jun. 9, 2022

(30) Foreign Application Priority Data
Dec. 4, 2020 (FR) ...................................... 20 12699

(51) Int. Cl.
*F01N 3/00* (2006.01)
*F01N 3/20* (2006.01)
*F01N 13/00* (2010.01)
*F01N 3/035* (2006.01)
*F01N 3/10* (2006.01)
*F01N 3/28* (2006.01)
*F01N 11/00* (2006.01)

(52) U.S. Cl.
CPC ........... *F01N 3/2013* (2013.01); *F01N 3/035* (2013.01); *F01N 3/103* (2013.01); *F01N 3/208* (2013.01);
(Continued)

(58) Field of Classification Search
CPC ........ F01N 3/2013; F01N 3/035; F01N 3/103; F01N 3/208; F01N 3/281; F01N 3/2828; F01N 3/2882; F01N 11/002; F01N 13/0093; F01N 13/0097; F01N 2240/16; F01N 2560/06; F01N 2560/14; F01N 2610/02; F01N 2610/1453
See application file for complete search history.

(56) References Cited

U.S. PATENT DOCUMENTS 8,800,276 B2 * 8/2014 Levin .................. B01F 23/2132
60/303
10,934,918 B1 * 3/2021 Goffe ................. B01D 53/9427
(Continued)

FOREIGN PATENT DOCUMENTS

DE 102006025678 A1 12/2007
DE 102016210640 A1 * 12/2017
(Continued)

OTHER PUBLICATIONS

French Search Report for French Application No. 20 12699 dated Jun. 28, 2021.

*Primary Examiner* — Matthew T Largi
(74) *Attorney, Agent, or Firm* — Carlson, Gaskey & Olds, P.C.

(57) ABSTRACT

A device for the post-treatment of the exhaust gas of an internal combustion engine comprises a conduit defining a passage for the flow of the exhaust gas and, from upstream to downstream of the conduit, an injector arranged to inject a reducing agent into the flow passage, and a purifying member. The injector is heated to heat the reducing agent prior to injection. The device further comprises a heating element arranged between the injector and the purifying member.

15 Claims, 1 Drawing Sheet

(52) U.S. Cl.
CPC .......... *F01N 3/281* (2013.01); *F01N 3/2828* (2013.01); *F01N 3/2882* (2013.01); *F01N 11/002* (2013.01); *F01N 13/0093* (2014.06); *F01N 13/0097* (2014.06); *F01N 2240/16* (2013.01); *F01N 2560/06* (2013.01); *F01N 2560/14* (2013.01); *F01N 2610/02* (2013.01); *F01N 2610/1453* (2013.01)

(56) References Cited

U.S. PATENT DOCUMENTS

| | | | | |
|---|---|---|---|---|
| 2009/0038299 | A1* | 2/2009 | Gierszewski | F01N 11/00 60/301 |
| 2010/0170233 | A1* | 7/2010 | Tangemann | B01D 53/90 60/299 |
| 2012/0255285 | A1* | 10/2012 | Gonze | F01N 3/035 60/300 |
| 2014/0050642 | A1* | 2/2014 | Yacoub | B01D 53/64 423/212 |
| 2016/0053652 | A1* | 2/2016 | van Vuuren | F01N 3/2066 60/274 |
| 2017/0198621 | A1* | 7/2017 | Gaiser | F01N 3/2066 |
| 2017/0321590 | A1* | 11/2017 | Di Perna | F01N 9/00 |
| 2018/0334939 | A1* | 11/2018 | Mital | F01N 3/2013 |
| 2020/0386137 | A1* | 12/2020 | Adelman | F01N 3/208 |

FOREIGN PATENT DOCUMENTS

| | | |
|---|---|---|
| DE | 102016223245 A1 | 5/2018 |
| EP | 3208438 A1 | 8/2017 |
| FR | 3024999 A1 | 2/2016 |

* cited by examiner

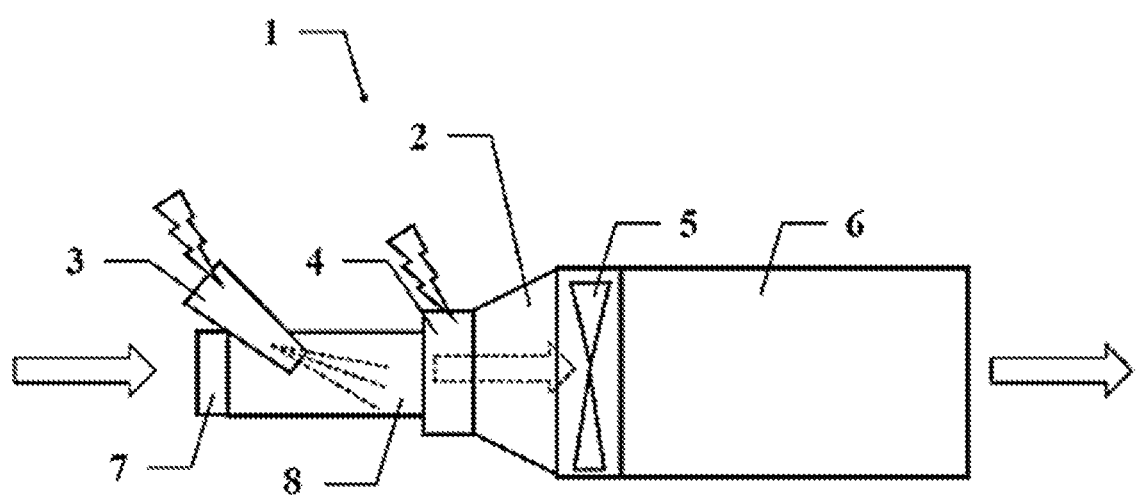

EXHAUST GAS POST-TREATMENT DEVICE

CROSS-REFERENCE TO RELATED APPLICATIONS

This application is a U.S. non-provisional application claiming the benefit of French Application No. 20 12699, filed on Dec. 4, 2020, which is incorporated herein by reference in its entirety.

TECHNICAL FIELD

The disclosure relates to an exhaust gas post-treatment device.

BACKGROUND

An exhaust gas post-treatment device is typically arranged in an exhaust line of an internal combustion engine. The function of the device is to reduce nitrogen oxide (NOx). To do this, such a device mixes a reducing agent, typically ammonia or an aqueous urea solution (AUS 32, DEF) with the exhaust gases, and treats the mixture using a purification member such as a catalyst or a selective catalytic reduction (SCR) substrate.

It is known to use a purification member to reduce the nitrogen oxide present in exhaust gasses.

For the purification member to be able to carry out a chemical reaction to reduce the nitrogen oxide, it must be supplied with exhaust gas mixed with a reducing agent.

To do this, a reducing agent injector is used, which is capable of injecting the reducing agent into a pipe where the exhaust gas flows. A mixer that homogenizes the exhaust gas with the reducing agent is also used. This is done upstream of the catalyst.

In order for the purification member to effectively reduce the nitrogen oxide with a good conversion efficiency, it must be at a high temperature, called the operating temperature, of at least 220° C.

In a steady state, this operating temperature of the purification member is maintained by the heat supplied by the hot exhaust gases from the engine and by the heat produced by the chemical reduction reaction.

In certain transitional phases of operation, during start-up, for example, the purification member is considered cold, i.e. at a temperature lower than that required to establish the chemical reduction reaction of the nitrogen oxide. Therefore, it is known to use a heating element capable of heating the exhaust gases and the purification member. Such a heating element is active during this transitional phase towards the steady state, so that this transitional phase is as short as possible and the purification member quickly reaches its operating temperature.

Improvements making it possible to further reduce the duration of the transitional phase of heating and reaching the active temperature of the purification member are still being sought.

SUMMARY

A device for post-treatment of exhaust gases from an internal combustion engine, comprises a conduit defining an exhaust gas flow passage and, from upstream to downstream of the conduit, an injector arranged to inject a reducing agent into the flow passage, and a purification member. The injector is heated to heat the reducing agent prior to injection. The device further comprises a heating element arranged between the injector and the purification member.

Particular features or embodiments, usable alone or in combination, are:
- the heating element is of the type comprising a grid or preferably a foam, arranged across the conduit;
- the grid or foam is metallic and electrically heated by Joule effect by using at least one electrode;
- the injector is distant from the heating element so as to maximize the surface of the heating element receiving the reducing agent;
- the device further comprises a mixer, arranged between the injector and the purification member, and preferably between the heating element and the purification member;
- the injector is thermally activated alone when the exhaust gas temperature is between 100° and 280° C., preferably between 130° and 220° C.;
- the heating element is thermally activated alone when the temperature of the exhaust gases is between 0° and 300° C., preferably between 0° and 220° C.;
- the injector and the heating element are thermally activated together when the exhaust gas temperature is between 100° and 250° and preferably between 130° and 220° C.;
- the injector is electrically heated by using flash boiling technology;
- the device further comprises an exhaust gas temperature sensor arranged at the inlet of the device, upstream of the injector.

In a second aspect of the disclosure, an exhaust line comprising such a device.

In a third aspect of the disclosure, a vehicle comprising such an exhaust line.

BRIEF DESCRIPTION OF THE DRAWINGS

The disclosure will be better understood from the following description, made solely by way of example, and with reference to the appended FIGURE in which:

FIG. 1 shows a synopsis of the device according to the disclosure.

DETAILED DESCRIPTION

With reference to FIG. 1, a device 1 for the post-treatment of exhaust gases from an internal combustion engine is organized along a conduit 2 carrying the exhaust gases. The conduit 2 defines an exhaust gas flow passage 8 extending between the upstream end and the downstream end. The flow passage 8 is shaped to conduct exhaust gases from the upstream end of the conduit 2 to the downstream end of the conduit 2. In FIG. 1, the exhaust gas flow is shown by arrows. Also, the exhaust gas flows from the upstream end, located on the left of FIG. 1, where the engine (not shown) producing the exhaust gas is located, to the downstream end, located on the right of FIG. 1. The conduit 2 covers the entire device 1 from its inlet at the upstream end to its outlet at the downstream end. The conduit 2 integrates and connects all the components, delivers the exhaust gas flow to its inlet and recovers it at its outlet after said flow has passed through the component.

The device 1 comprises an injector 3 and a purification member 6, sequentially from upstream to downstream, connected by the conduit 2. The injector 3 is capable of injecting a reducing agent into the flow passage 8, so that said reducing agent mixes with the exhaust gases flowing in the conduit 2. The purification member 6 is capable of reducing the mixture of exhaust gases and reducing agent in order to reduce the nitrogen oxide contained in the exhaust gases.

According to one feature of the disclosure, the injector 3 is heated. This makes it possible to be able to heat the reducing agent prior to injection. Thus, the heat input produced by the heated injector 3 makes it possible for the reducing agent to be injected in the form of micro-droplets.

Heating the reducing agent, bringing it closer to its evaporation temperature, facilitates its mixing with the exhaust gases and contributes to the mixing and homogenizing of the exhaust gases with the reducing agent, thus improving the chemical reduction reaction of the nitrogen oxide.

This is all the more effective since the above feature of heating the injector 3 is accompanied by heating, carried out by a heating element 4, integrated into the device 1. This heating element 4 is advantageously arranged between the injector 3 and the purification member 6. Thus, the heating element 4 heats the mixture of exhaust gas and reducing agent, which in turn heats the purification member 6 when it passes through the purification member 6.

According to another feature, the heating element 4 is of the type comprising a grid or preferably a foam, arranged across the conduit 2. In this type of heating element, also referred as an electrically heated catalyst (the acronym EHC), a grid or foam slice is arranged across the section of the conduit 2. This slice is heated. The mixture of exhaust gas and reducing agent flowing in the conduit 2 passes through this hot slice and heats up as it passes through.

In addition, a grid, and even more so a foam, resists the passage of the exhaust gas and reducing agent mixture. This resistance is accompanied by a disturbance of the flow, which creates turbulence favorable to the reducing agent mixture homogenizing with the exhaust gases. Also, the heating element 4 contributes to the function of mixing the exhaust gases and the reducing agent, via its grid or its foam.

According to another feature, the grid or foam is metallic. Thus, it can be electrically heated by Joule effect by using at least one electrode, and preferably two electrodes, arranged at two ends of the heating element 4.

According to another feature, the injector 3 is distanced from the heating element 4, in order to maximize the surface of the heating element 4 receiving reducing agent. The injector 3 produces a substantially conical jet. The distance between the injector 3 and the heating element 4 is determined by the person skilled in the art in such a way that the injection cone covers substantially the largest possible surface of the heating element 4.

Heating the heating element 4 contributes to heating the reducing agent. As before, for the injector 3, heating the reducing agent is advantageous in that it helps the reducing agent to evaporate and thereby improves the homogenization of the exhaust gas mixture and the reducing agent. In addition, heating the reducing agent, either by the injector 3 and/or by the heating element 4, significantly reduces the risk of depositing reducing agent on the heating element 4.

It has been seen that the heating element 4 performs a function of mixing the reducing agent with the exhaust gases, via its grid or its foam. It is possible that this mixture is not sufficiently homogeneous, upstream of the purification member 6, to reduce the nitrogen oxide. Also, according to another feature, the device 1 comprises a mixer 5. This mixer 5, dedicated to the function of mixing the reducing agent and the exhaust gases, can be of any type.

Beneficial reference is made to the numerous existing mixing devices comprising a reducing agent injector and a mixer, such as those filed by the applicant, for example.

Such a mixer 5 is preferably arranged between the injector 3 and the purification member 6, and its function is to complete or perfect the homogenization of the mixture of exhaust gas and reducing agent in order to optimize the NOx conversion (reduction) in the purification member 6.

It has been seen that the heating by the injector 3 and the heating by the heating element 4 are synergetic. This is further complemented by sequencing these two heaters based on the exhaust gas temperature.

Depending on the exhaust gas temperature, the thermal control systems for heating the injector 3 and the heating element 4 can be activated or deactivated simultaneously or alternately, in order to optimize the heating efficiency of the purification member 6.

The different heating modes are: heating the heating element 4 alone, heating the injector 3 alone, heating the heating element 4 and the injector 3 together, and no heating.

Preferably, as the temperature rises, the heating element 4 alone is first heated. Then, the injector 3 and the heating element 4 are heated together. Then, the injector 3 is heated alone. Finally, when everything is hot enough, neither the injector 3 nor the heating element 4 is heated.

It should be noted that the injector 3 can operate without heating. It then behaves like a conventional injector. It can operate in unheated mode from 0° to 500° C.

Also, according to another feature, the injector 3 alone is thermally activated when the exhaust gas temperature is between 100° and 280° C. and preferably between 130° and 220° C.

According to another feature, the heating element 4 alone is thermally activated when the exhaust gas temperature is between 0° and 300° C., preferably between 0° and 220° C.

According to another feature, the injector 3 and the heating element 4 are thermally activated together when the exhaust gas temperature is between 100° and 250° C., preferably between 130° and 220° C.

According to another feature, the injector 3 is electrically heated by using flash boiling technology.

It has been seen that controlling the heating of the injector 3 and controlling the heating element 4 are carried out based on the exhaust gas temperature. Also, according to another feature, the device 1 comprises an exhaust gas temperature sensor 7. This temperature sensor 7 is advantageously arranged at the inlet of the device 1, upstream of the injector 3.

The disclosure further relates to an exhaust line comprising at least one such device 1.

The disclosure further relates to a vehicle comprising such an exhaust line.

The disclosure has been illustrated and described in detail in the drawings and the preceding description. The latter should be considered as illustrative and given as an example and not as limiting the disclosure to this description alone. Many variant embodiments are possible.

The type of heating used in the injector 3 is called flash boiling technology because the reducing agent is heated to a constant volume, in a heating capsule, for example, before being injected into the flow passage 8.

The injector 3 heated by flash boiling technology makes it possible to reached the boiling/evaporation temperature of the reducing agent with less electrical power. In contrast, the electrical power would be much higher in a conventional heating system where the reducing agent would be sprayed onto a heating element at atmospheric pressure.

The injector 3, heated by flash boiling technology, then makes a partial vaporization of the reducing agent possible at a lower energy cost.

Such an injector 3 heated by flash boiling technology then makes it possible to improve the mixing of the reducing agent in the flow passage 8, but also makes it possible to inject a part of the reducing agent in its gaseous form, thus reducing the time for the reducing agent to decompose, into urea, for example, via thermolysis and hydrolysis.

Although various embodiments have been disclosed, a worker of ordinary skill in this art would recognize that certain modifications would come within the scope of this disclosure. For that reason, the following claims should be studied to determine the true scope and content of this disclosure.

LIST OF REFERENCE SIGNS

1: device,
2: conduit,
3: injector,
4: heating element,
5: mixer,
6: purification member,
7: temperature sensor,
8: flow passage.

The invention claimed is:

1. A device for post-treatment of exhaust gases of an internal combustion engine, comprising:
   a conduit defining an exhaust gas flow passage and, from upstream to downstream of the conduit, an injector arranged to inject a reducing agent into the exhaust gas flow passage, and a purification member;
   wherein the injector is heated to heat the reducing agent prior to injection;
   a heating element arranged between the injector and the purification member; and
   wherein as exhaust gas temperature rises:
      the heating element alone is first heated,
      the injector and the heating element are then heated together,
      the injector is then heated alone, and
      neither the injector nor the heating element is heated when the exhaust gas temperature reaches a predetermined temperature level.

2. The device according to claim 1, wherein the injector is distanced from the heating element so as to maximize a surface of the heating element receiving reducing agent.

3. The device according to claim 1, further comprising a mixer, arranged between the injector and the purification member.

4. The device according to claim 1, wherein the injector alone is thermally activated when exhaust gas temperature is between 100° and 280° C.

5. The device according to claim 4, wherein the injector alone is thermally activated when the exhaust gas temperature is between 130° and 220° C.

6. The device according to claim 1, wherein the heating element alone is thermally activated when exhaust gas temperature is between 0° and 300° C.

7. The device according to claim 6, wherein the heating element alone is thermally activated when the exhaust gas temperature is between 0° and 220° C.

8. The device according to claim 1, wherein the injector and the heating element are thermally activated together when exhaust gas temperature is between 100° and 250° C.

9. The device according to claim 8, wherein the injector and the heating element are thermally activated together when the exhaust gas temperature is between 130° and 220° C.

10. The device according to claim 1, wherein the injector is electrically heated by flash boiling technology.

11. The device according to claim 1, further comprising an exhaust gas temperature sensor arranged at an inlet of the device, upstream of the injector.

12. An exhaust line comprising the device according claim 1.

13. A vehicle comprising the exhaust line according to claim 12.

14. The device according to claim 1, further comprising a mixer arranged between the heating element and the purification member.

15. The device according to claim 1, wherein only the heating element is heated until a first predetermined temperature is reached, and wherein the injector and the heating element are heated together once the first predetermined temperature is exceeded and until a second predetermined temperature is reached that is higher than the first predetermined temperature, and wherein only the injector is heated once the second predetermined temperature is exceed and until the predetermined temperature level is reached.

* * * * *